US012750293B2

(12) United States Patent
Shibata

(10) Patent No.: US 12,750,293 B2
(45) Date of Patent: Sep. 29, 2026

(54) CONVEYANCE SYSTEM

(71) Applicant: MURATA MACHINERY, LTD., Kyoto (JP)

(72) Inventor: Kotaro Shibata, Ise (JP)

(73) Assignee: Murata Machinery, Ltd., Kyoto (JP)

( * ) Notice: Subject to any disclaimer, the term of this patent is extended or adjusted under 35 U.S.C. 154(b) by 105 days.

(21) Appl. No.: 18/851,381

(22) PCT Filed: Mar. 13, 2023

(86) PCT No.: PCT/JP2023/009682
§ 371 (c)(1),
(2) Date: Sep. 26, 2024

(87) PCT Pub. No.: WO2023/214478
PCT Pub. Date: Nov. 9, 2023

(65) Prior Publication Data

US 2025/0219920 A1 Jul. 3, 2025

(30) Foreign Application Priority Data

May 2, 2022 (JP) ................................ 2022-076009

(51) Int. Cl.
*H04L 43/0811* (2022.01)
*H04B 17/318* (2015.01)
*H04Q 9/00* (2006.01)

(52) U.S. Cl.
CPC ........ *H04L 43/0811* (2013.01); *H04B 17/318* (2015.01); *H04Q 9/00* (2013.01)

(58) Field of Classification Search
CPC ............ H04L 43/0811; H04L 43/0817; H04L 43/0823–0847; H04L 43/10;
(Continued)

(56) References Cited

U.S. PATENT DOCUMENTS 10,448,411 B1 * 10/2019 Jorgovanovic ...... H04L 43/0829
2017/0208498 A1 * 7/2017 Lee ...................... H04W 24/04
(Continued)

FOREIGN PATENT DOCUMENTS

JP 2003-173299 A 6/2003
JP 2007026237 A 2/2007
(Continued)

OTHER PUBLICATIONS

International Search Report dated Apr. 25, 2023, of counterpart International Application No. PCT/JP2023/009682 along with an English translation.

*Primary Examiner* — David R Lazaro
(74) *Attorney, Agent, or Firm* — DLA Piper LLP (US)

(57) ABSTRACT

A conveyance system includes a transport vehicle configured to transport an article to or from a passive device and including a communication unit configured to communicate wirelessly with the passive device. The transport vehicle includes: a counter configured to generate a counter value corresponding to an elapsed time from a timing when reception has become impossible due to a communication failure during wireless communication with the passive device; and an output unit configured to output the counter value when a time-out error has occurred in the transport vehicle, and the counter resets the counter value whenever reception is possible.

3 Claims, 7 Drawing Sheets

(58) Field of Classification Search
CPC ...... H04L 43/106; H04B 17/318; H04Q 9/00; B65G 1/00; H10P 72/30
See application file for complete search history.

(56) References Cited

U.S. PATENT DOCUMENTS

| | | | | |
|---|---|---|---|---|
| 2018/0278091 | A1* | 9/2018 | Fukasawa | G05B 15/02 |
| 2020/0404513 | A1* | 12/2020 | Hayes | G16Y 40/35 |
| 2021/0057254 | A1 | 2/2021 | Kitamura et al. | |
| 2025/0024301 | A1* | 1/2025 | Yao | H04W 76/28 |
| 2025/0219920 | A1* | 7/2025 | Shibata | H04L 43/0811 |

FOREIGN PATENT DOCUMENTS

| | | | |
|---|---|---|---|
| JP | 2016-118845 | A | 6/2016 |
| JP | 2019-71692 | A | 5/2019 |
| WO | 2019/138802 | A1 | 7/2019 |

* cited by examiner

CONVEYANCE SYSTEM

CROSS-REFERENCE TO RELATED APPLICATIONS

This application is a US national stage filing under 35 U.S.C. § 371 of International Application No. PCT/JP2023/009682, filed Mar. 13, 2023, which claims priority to Japanese Patent Application No. 2022-076009, filed May 2, 2022, each of which is incorporated herein by reference in its entirety.

TECHNICAL FIELD

This disclosure relates to a conveyance system.

BACKGROUND

In semiconductor manufacturing plants or the like, conveyance systems including transport devices are used to automatically transport products to be manufactured to semiconductor manufacturing equipment or the like. In such a conveyance system, signals are exchanged between a transport device configured to transport a product to be manufactured and semiconductor manufacturing equipment or the like. If this signal exchange has not been performed normally for a predetermined period of time, a time-out error occurs. For example, Japanese Unexamined Patent Publication No. 2016-118845 discloses a communication device connected to manufacturing equipment and configured to be able to accumulate data for analyzing the cause of an error. In that communication device, time data including the time when predetermined packet data received by a communication unit has been transmitted and the time when a predetermined port state has been detected by an IO monitor section is accumulated in a storage unit. That time data is used to determine whether transfer control needs to be modified.

When a time-out error has occurred in the signal exchange between the transfer device configured to transfer a product to be manufactured and the semiconductor manufacturing equipment or the like, it is difficult to determine whether the time-out error has been caused by the communication environment or the signal transmission by the semiconductor manufacturing equipment or the like, based on only the time data as described in Japanese Unexamined Patent Publication No. 2016-118845.

It could therefore be helpful to provide a conveyance system that can assist in determining the cause of a time-out error.

SUMMARY

A conveyance system includes a transport vehicle, the transport vehicle being configured to transport an article to or from a passive device and including a communication unit configured to communicate wirelessly with the passive device. The transport vehicle includes: a counter configured to generate a counter value corresponding to an elapsed time from a timing when reception has become impossible due to a communication failure during wireless communication with the passive device; and an output unit configured to output the counter value when a time-out error has occurred in the transport vehicle. The counter resets the counter value whenever reception is possible.

In the conveyance system, an operator can estimate whether the cause of the time-out error is a communication error or an error of the passive device simply by checking the counter value output from the output unit (i.e., checking whether the counter value has been reset). If the counter value is zero at the time when the time-out error has occurred in the transport vehicle, the operator can obtain that wireless communication has been performed normally and thus can presume that the passive device is the cause of the time-out error. If the counter value equal to or larger than a certain value has been output at the time when a time-out error has occurred in the transport vehicle, the operator knows that wireless communication has not been performed for a certain period of time. Thus, it can be presumed that the cause of the time-out error is a communication failure. With the conveyance system that can generate and output these counter values, it is possible to assist in determining the cause of a time-out error.

The wireless communication between the transport vehicle and the passive device may be wireless communication of an E84 signal specified in an international standard for semiconductor manufacturing equipment, and the output unit may output the counter value only when a time-out error due to the E84 signal has occurred. In this case, generation and output of counter values during an unnecessary period of time can be prevented. Consequently, counter values useful for determining the cause of time-out errors can be reliably output.

The conveyance system that can assist in determining the cause of a time-out error can thus be provided.

Figure 4A:
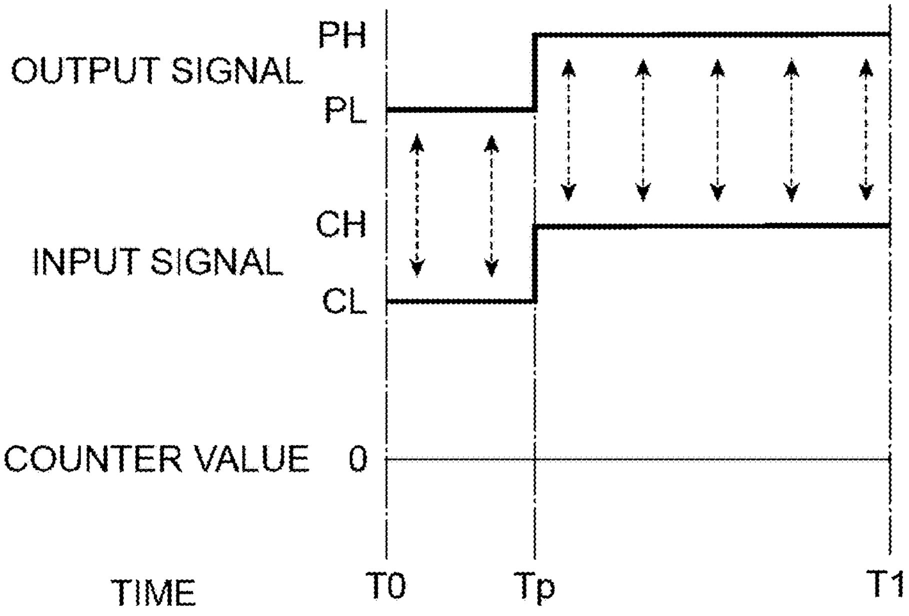
Figure 4B:
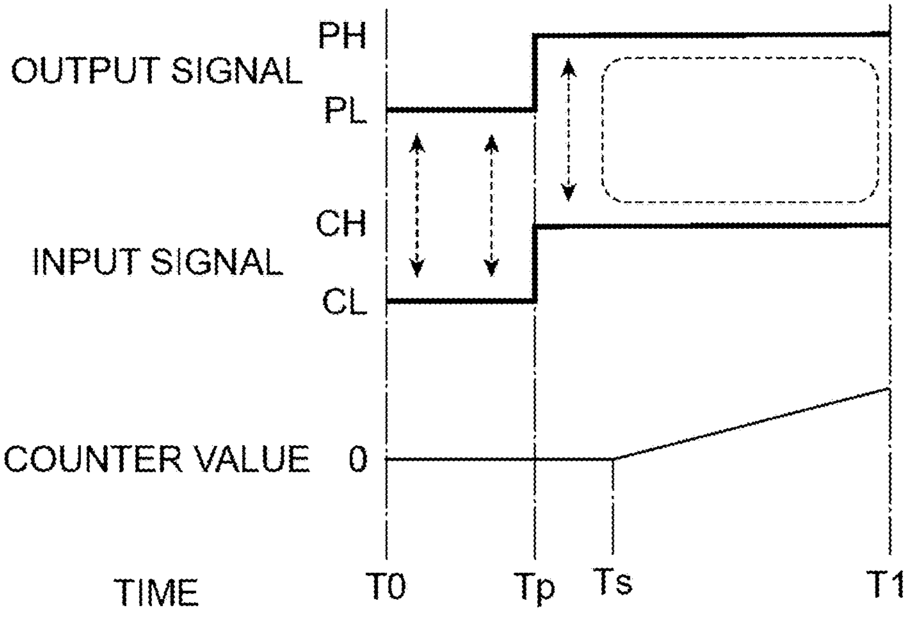

Each of FIG. 4(*a*) and FIG. 4(*b*) is a timing chart for describing a normal example of wireless communication between the overhead transport vehicle and the semiconductor processing apparatus.

Figure 5A:
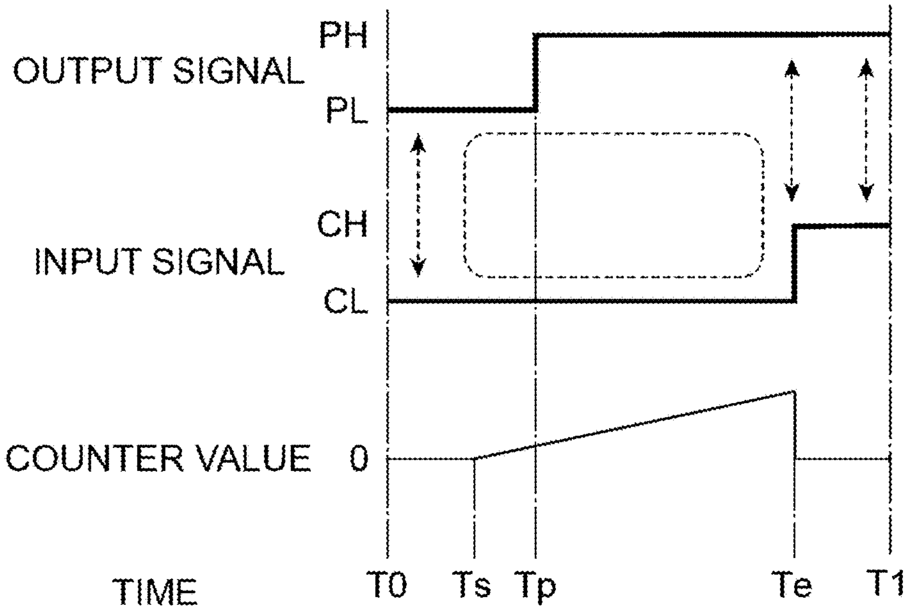
Figure 5B:
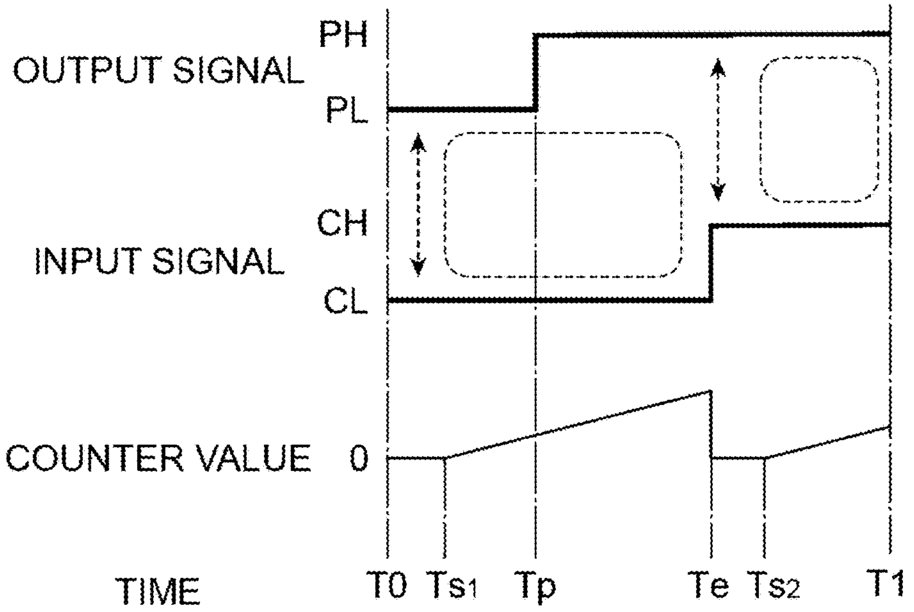

Each of FIG. 5(*a*) and FIG. 5(*b*) is a timing chart for describing a normal example of wireless communication between the overhead transport vehicle and the semiconductor processing apparatus.

Figure 6A:
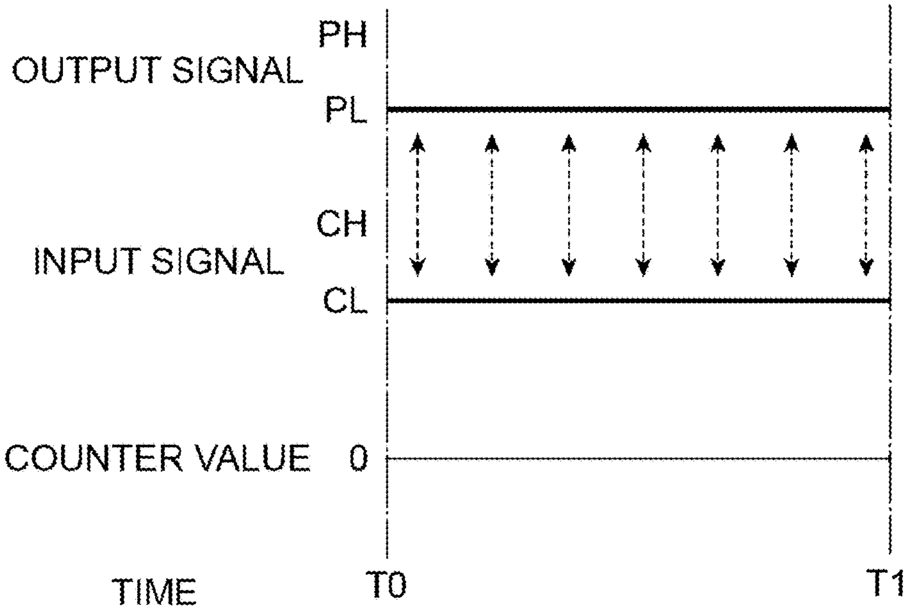
Figure 6B:
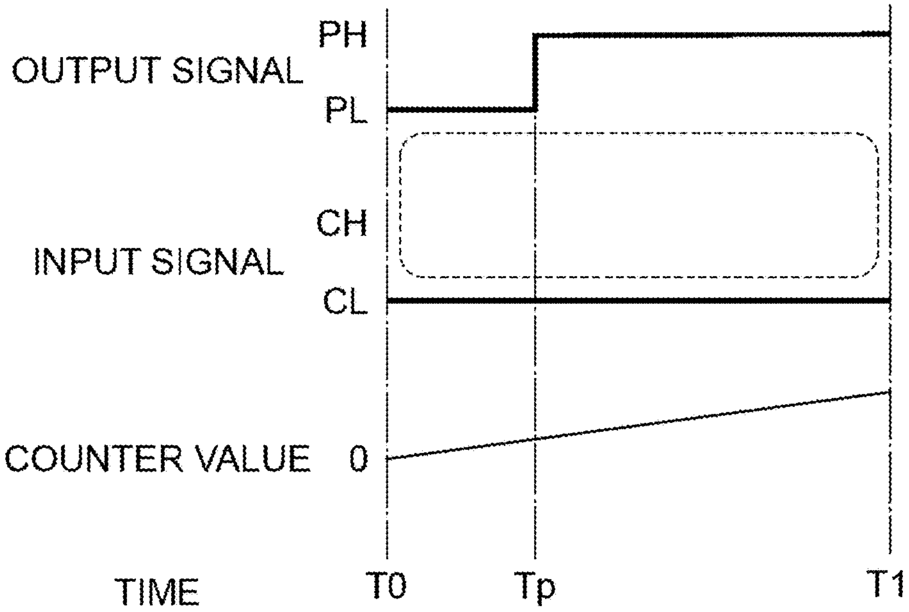

Each of FIG. 6(*a*) and FIG. 6(*b*) is a timing chart for describing an abnormal example of wireless communication between the overhead transport vehicle and the semiconductor processing apparatus.

Figure 7A:
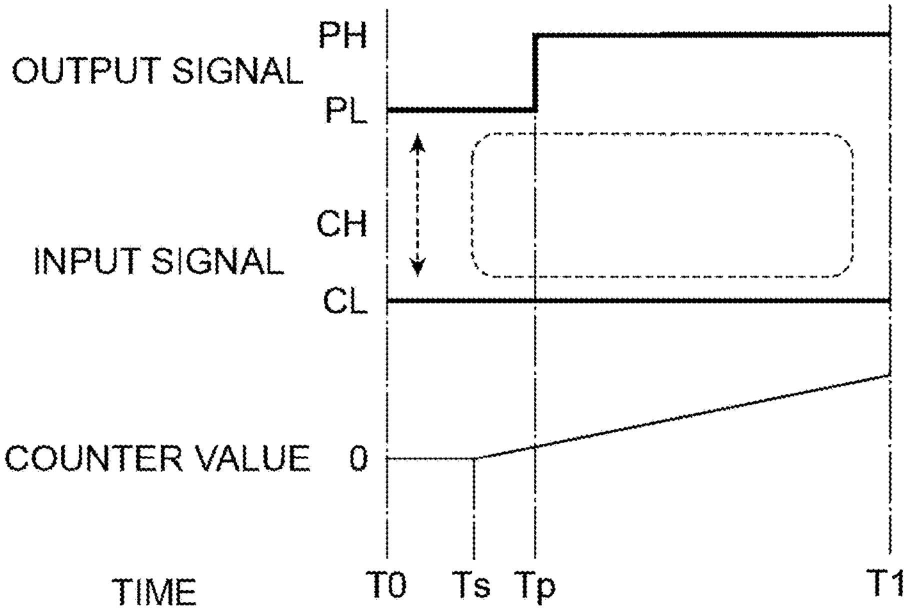
Figure 7B:
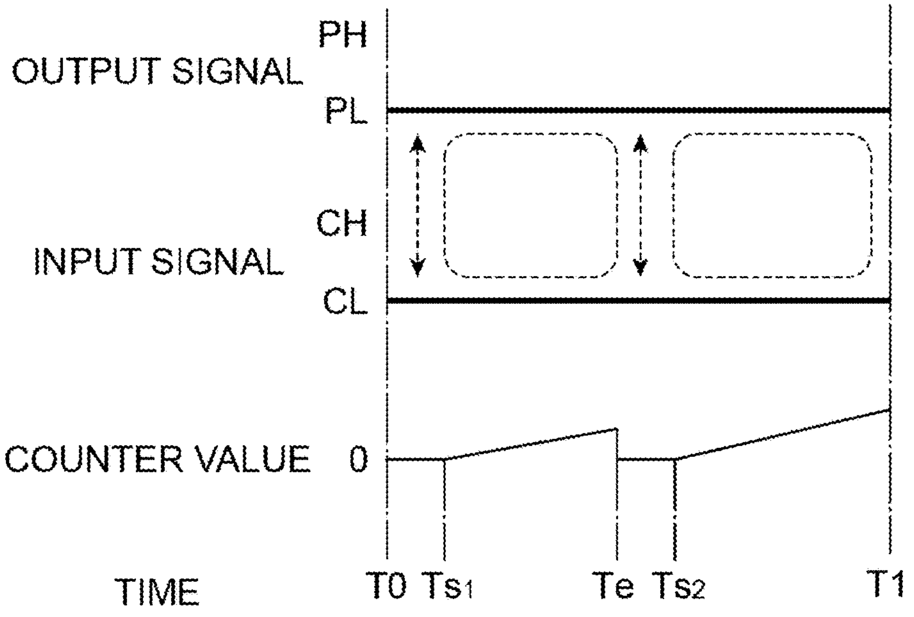

Each of FIG. 7(*a*) and FIG. 7(*b*) is a timing chart for describing an abnormal example of wireless communication between the overhead transport vehicle and the semiconductor processing apparatus.

REFERENCE SIGNS LIST

1 . . . conveyance system
10 . . . first track
20 . . . second track
30 . . . storage shelf
40 . . . overhead transport vehicle
41 . . . gripping unit
42 . . . lifting mechanism
43 . . . movement mechanism
44 . . . controller
45 . . . communication unit
100 . . . semiconductor processing apparatus

101 . . . communication unit
102 . . . controller
110 . . . device port
200 . . . FOUP (article)

DETAILED DESCRIPTION

An embodiment of my systems will now be described in detail with reference to the attached drawings. In the description of the drawings, like or equivalent elements are designated by like reference signs, and duplicate description is omitted.

Figure 1:
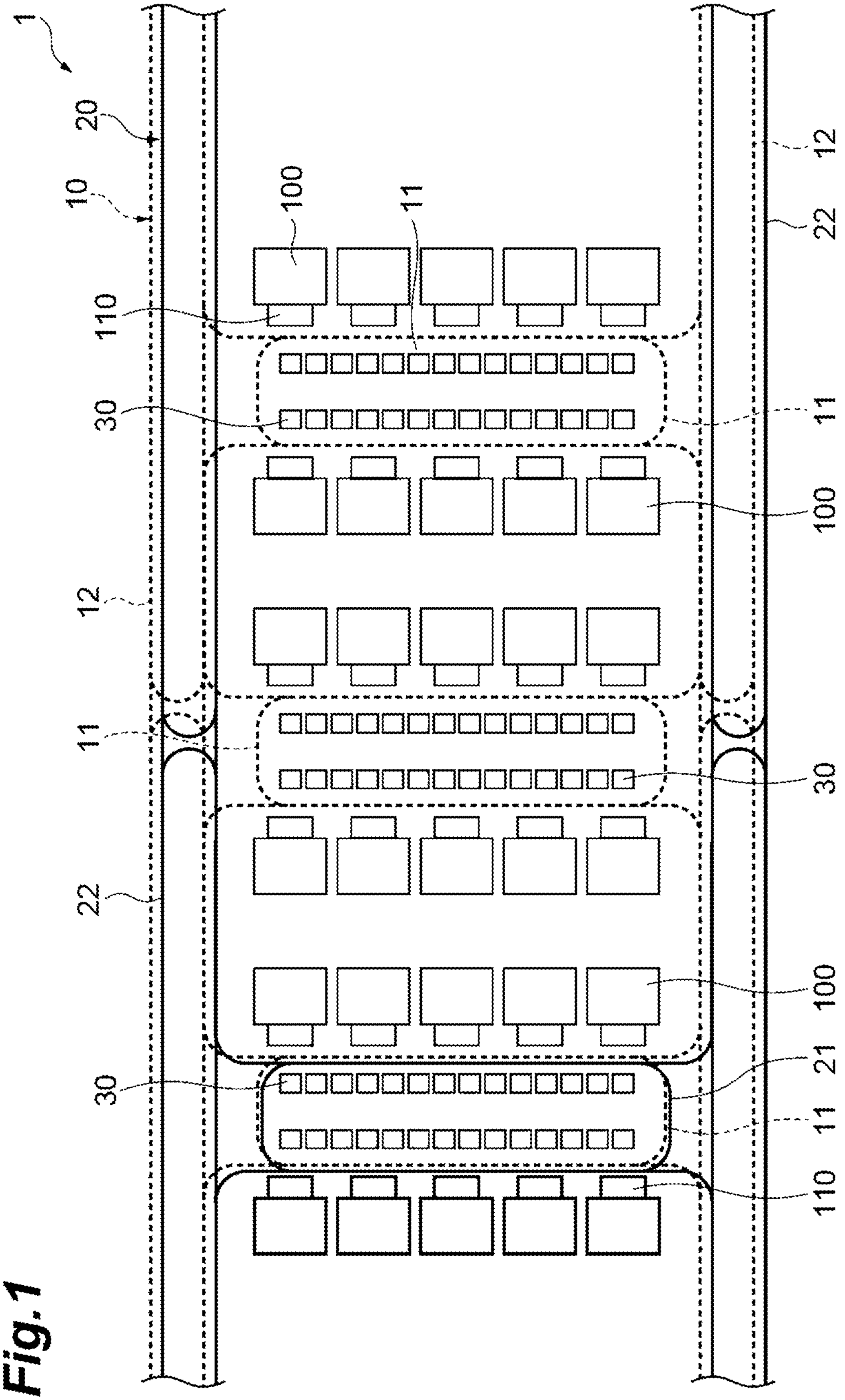
FIG. 1 is a plan view of a conveyance system according to an embodiment.
Figure 2:
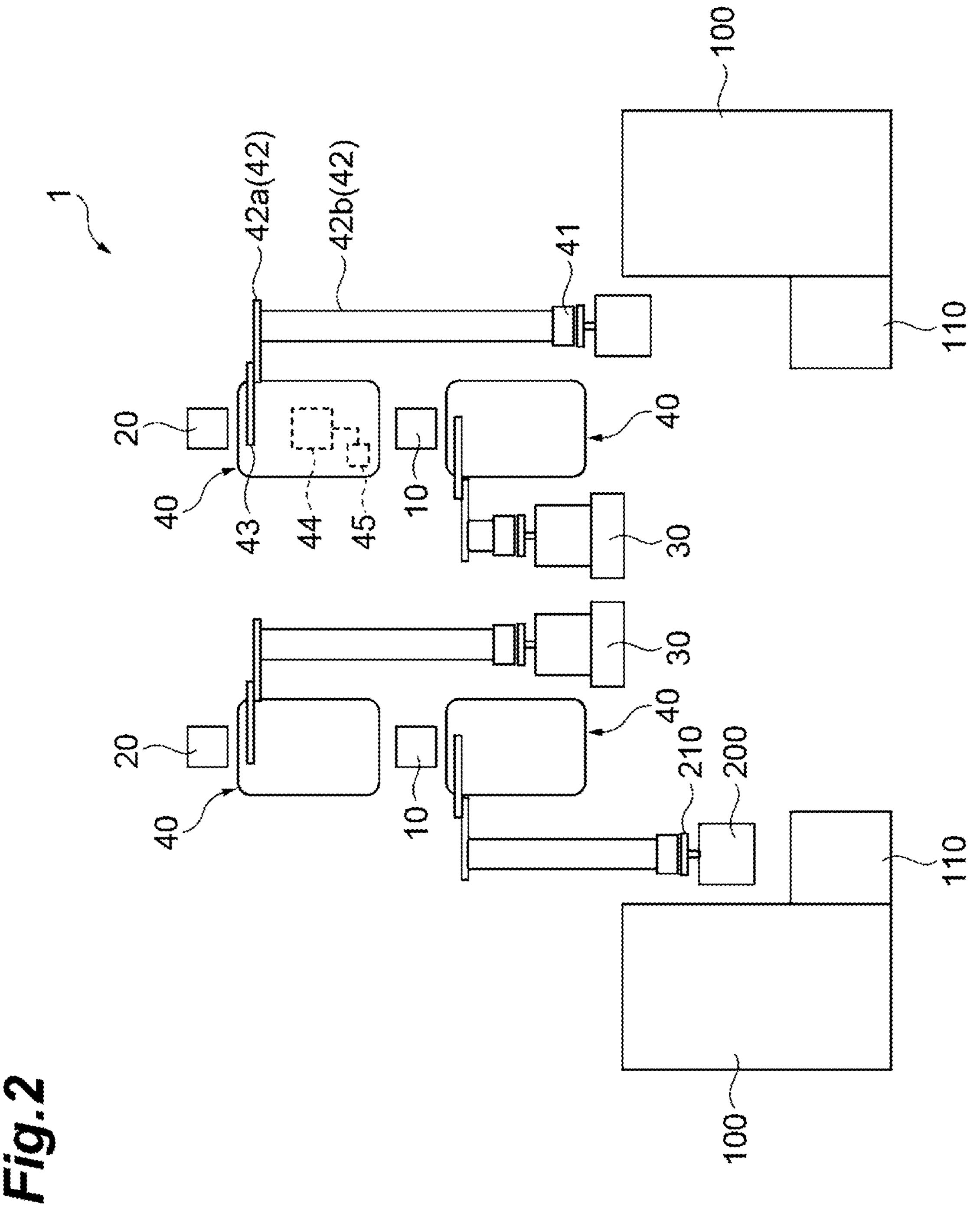
FIG. 2 is a front view of part of the conveyance system.

My conveyance system will be described first with reference to FIGS. 1 and 2. FIG. 1 is a plan view of the conveyance system. FIG. 2 is a front view of part of the conveyance system. As illustrated in FIG. 1, this conveyance system 1 is, for example, a system installed in a semiconductor manufacturing plant including semiconductor processing apparatuses 100 each of which is a passive device and configured to transport an article such as a FOUP (object to be transported) 200. The FOUP 200 is a container (FOUP: Front Opening Unified Pod) for storing semiconductor wafers. Each semiconductor processing apparatus 100 is a processing apparatus for the semiconductor wafers (e.g., cleaning equipment, etching equipment, deposition equipment) and includes a device port 110 for carrying in and out a FOUP 200.

As illustrated in FIGS. 1 and 2, the conveyance system 1 includes a first track 10, a second track 20, storage shelves 30, and a plurality of overhead transport vehicles 40 (transport vehicles). In the conveyance system 1, for example, the FOUP 200 is transferred to the device port 110 of a semiconductor processing apparatus 100 by an overhead transport vehicle 40 traveling along the first track 10 or the second track 20. Although not illustrated, the conveyance system 1 further includes, for example, a HOST and a material control system (MCS) as control devices. Each of the HOST and the MCS is, for example, an electronic control unit constituted by a central processing unit (CPU), a read only memory (ROM), a random access memory (RAM), and the like. The HOST is an upper-level controller. The HOST can be a manufacturing execution system (MES). The HOST outputs a signal including various commands such as a conveyance command and a traveling command (hereinafter simply referred to as "command") to the MCS. When having acquired the command from the HOST, the MCS outputs the command via a transport vehicle controller to each overhead transport vehicle 40, for example, at a predetermined timing.

The first track 10 is a member (traveling path) on which the overhead transport vehicle 40 travels, and is suspended from the ceiling. The conveyance system 1 constitutes a plurality of systems (bays). The conveyance system 1 includes a plurality of intrabay routes, which are traveling paths within bays, and an interbay route, which is a traveling path connecting different bays. The intrabay routes are disposed along a plurality of the device ports 110. The first track 10 includes intrabay tracks 11 disposed in the intrabay routes and an interbay track 12 disposed in the interbay route. Each intrabay track 11 is a track extending near the storage shelves 30, the semiconductor processing apparatuses 100, and the like, and is set such that the overhead transport vehicle 40 travels one way clockwise. Similarly to the intrabay track 11, the interbay track 12 is also set such that the overhead transport vehicle 40 travels one way clockwise. In the first track 10, settings may be made such that the overhead transport vehicle 40 travels one way counterclockwise.

The second track 20 is a member (traveling path) on which the overhead transport vehicle 40 travels, and is suspended from the ceiling. The second track 20 includes an intrabay track 21 disposed in some of the intrabay routes and an interbay track 22 disposed in the interbay route. The intrabay track 21 is a track extending near the storage shelves 30, the semiconductor processing apparatuses 100, and the like, and is set such that the overhead transport vehicle 40 travels one way clockwise. Similarly to the intrabay track 21, the interbay track 22 is also set such that the overhead transport vehicle 40 travels one way clockwise. In the second track 20, settings may be made such that the overhead transport vehicle 40 travels one way counterclockwise.

As illustrated in FIG. 2, the first track 10 and the second track 20 are disposed in parallel with each other in the up-down (vertical) direction. The first track 10 is positioned below the second track 20. In other words, the second track 20 is located above the first track 10. In FIG. 1, the first track 10 is illustrated as a dashed line and the second track 20 as a solid line.

As illustrated in FIG. 1, in the conveyance system 1, the device ports 110 of the respective semiconductor processing apparatuses 100 are disposed outside the intrabay routes, along the direction in which the first track 10 and the second track 20 extend. The respective device ports 110 are provided to be positioned on one side of and below the first track 10 and the second track 20 that are disposed in parallel with each other in the up-down direction.

The device ports 110 each have the FOUPs 200 that are transferred from the overhead transport vehicle 40 placed thereon, and transfer the FOUPs 200 to the corresponding semiconductor processing apparatuses 100. When semiconductor wafers accommodated in the FOUPs 200 are processed by the semiconductor processing apparatuses 100, the device ports 110 each transfer the FOUPs 200 from the semiconductor processing apparatuses 100, and thus have the FOUPs 200 placed thereon.

Each storage shelf 30 is a member configured to store the FOUP 200. The storage shelves 30 each support the FOUP 200. The storage shelves 30 are suspended from the ceiling, for example. Each storage shelf 30 can be an overhead buffer (OHB). On a region on the storage shelf 30, the FOUP 200 can be placed. That region on the storage shelf 30 is a temporary storage region onto which the overhead transport vehicles 40 that stop on the first track 10 and the second track 20 can transfer the FOUP 200.

As illustrated in FIG. 2, the storage shelves 30 are provided on the other side of and below the first track 10 and the second track 20, the other side being opposed to the one side on which the device ports 110 are provided. Specifically, when viewed from the vertical direction, the storage shelves 30 are provided on the side opposed to the device ports 110 with the first track 10 and the second track 20 interposed therebetween. The storage shelves 30 are provided inside each intrabay route having a loop shape.

Each overhead transport vehicle 40 is a device configured to transport a FOUP 200 in areas where it may interfere with passive devices such as the storage shelves 30 and the semiconductor processing apparatuses 100, and travels along the first track 10 or the second track 20. Examples of the overhead transport vehicle 40 include a crane suspended from a ceiling and an overhead hoist transfer (OHT). The overhead transport vehicle 40 includes a gripping unit 41, a lifting mechanism 42, a movement mechanism 43, a controller 44, and a communication unit 45.

The gripping unit 41 is a device configured to grip and release the FOUP 200. The gripping unit 41 can grip a flange portion 210 of the FOUP 200. When the overhead transport vehicle 40 receives the FOUP 200 from the device port 110 or the storage shelf 30, the gripping unit 41 grips the flange portion 210 of the FOUP 200. When the overhead transport vehicle 40 places the FOUP 200 onto the device port 110 or the storage shelf 30, the gripping unit 41 releases the flange portion 210 of the FOUP 200.

The lifting mechanism 42 is a device (e.g., hoist) configured to raise and lower the gripping unit 41 in the vertical direction. The lifting mechanism 42 can raise and lower the gripping unit 41 in the vertical direction. The lifting mechanism 42 includes a winding mechanism 42*a* and a belt 42*b*. The winding mechanism 42*a* is held by the movement mechanism 43. The winding mechanism 42*a* is a device configured to wind up and wind down the belt 42*b* in the vertical direction. The winding mechanism 42*a* can wind up and wind down the belt 42*b* in the vertical direction. The belt 42*b* is suspended from the winding mechanism 42*a*. The belt 42*b* holds the gripping unit 41 at the lower end thereof. The lifting mechanism 42 can wind up and wind down the FOUP 200 gripped by the gripping unit 41 for a distance at least allowing the FOUP 200 to reach the device port 110 and the storage shelf 30.

The movement mechanism 43 is a device configured to move the gripping unit 41 and the lifting mechanism 42 along a side of the overhead transport vehicle. Specifically, the movement mechanism 43 can move the gripping unit 41 and the lifting mechanism 42 from the overhead transport vehicle 40 in the horizontal direction orthogonal to the traveling direction of the overhead transport vehicle 40. The movement mechanism 43 can move the gripping unit 41 and the lifting mechanism 42 to above each of the device port 110 and the storage shelf 30. When the FOUP 200 is gripped by the gripping unit 41, the movement mechanism 43 can move the FOUP 200 to or from above the device port 110 and the storage shelf 30 in the vertical direction.

Each of the overhead transport vehicles 40 that stop at the same position in the traveling direction on each of the first track 10 and the second track 20 can transfer the FOUP 200 to both the device port 110 and the storage shelf 30, which are positioned in the side of and below the first track 10 and the second track 20. In other words, the respective overhead transport vehicles 40 can transfer the FOUP 200 to the same device port 110 and the same storage shelf 30. Specifically, the FOUP 200 can be delivered (transferred) to and from the device port 110 by both of the overhead transport vehicle 40 in the first track 10 and the overhead transport vehicle 40 in the second track 20. And both of the overhead transport vehicle 40 in the first track 10 and the overhead transport vehicle 40 in the second track 20 can deliver the FOUP 200 to and from the storage shelf 30.

The overhead transport vehicles 40 each move the FOUP 200 upward above each of the device port 110 and the storage shelf 30, by operating the movement mechanism 43 from a state where the gripping unit 41 grips the flange portion 210 of the FOUP 200 directly under the first track 10 and the second track 20. Subsequently, each overhead transport vehicle 40 operates the winding mechanism 42*a* to wind down the belt 42*b*, thereby lowering the FOUP 200 to place the FOUP 200 on the device port 110 or on the storage shelf 30. As described above, the overhead transport vehicle 40 transfers (places) the FOUP 200 to (on) the device port 110 and the storage shelf 30.

The overhead transport vehicle 40 causes the gripping unit 41 to grip the flange portion 210 of the FOUP 200 placed on the device port 110 or on the storage shelf 30. Subsequently, the overhead transport vehicle 40 causes the winding mechanism 42*a* to operate to wind up the belt 42*b*, thereby raising the FOUP 200. Subsequently, each of the overhead transport vehicles 40 causes the movement mechanism 43 to operate to move the FOUP 200 to directly below the first track 10 and the second track 20. As described above, each overhead transport vehicle 40 transfers (receives) the FOUP 200 from the device port 110 or the storage shelf 30.

The controller 44 is a device configured to control operation of the overhead transport vehicle 40. The controller 44 is, for example, an electronic control unit constituted by a central processing unit (CPU), a read only memory (ROM), a random access memory (RAM), and the like. The controller 44 communicates with the semiconductor processing apparatus 100 to be a target in response to a command from the above-described control devices, and controls traveling of the overhead transport vehicle 40, operation of the gripping unit 41, operation of the lifting mechanism 42, operation of the movement mechanism 43, and the like.

Figure 3:
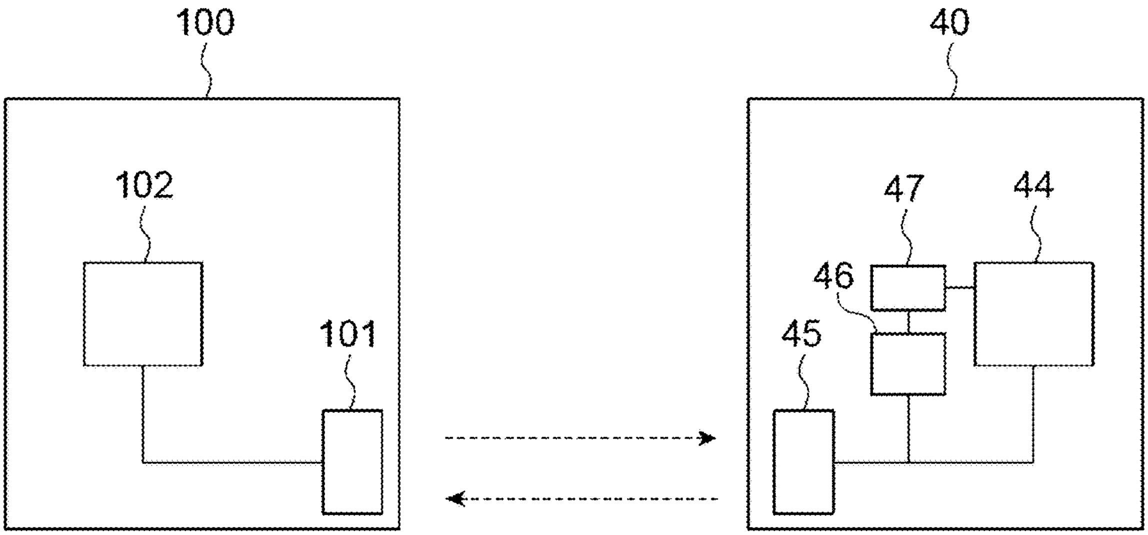
FIG. 3 is a schematic diagram illustrating communication between an overhead transport vehicle and a semiconductor processing apparatus.

The communication unit 45 is a device capable of communicating with the above-described control devices, the semiconductor processing apparatuses 100, and the like, and is disposed at a predetermined position in the overhead transport vehicle 40. FIG. 3 is a schematic diagram illustrating communication between an overhead transport vehicle and a semiconductor processing apparatus. As illustrated in FIG. 3, the semiconductor processing apparatus 100 includes a communication unit 101 capable of communicating with the conveyance system 1 and a controller 102 connected to the communication unit 101. The controller 44 and the communication unit 45 transmit and receive data to and from each other. Similarly, the communication unit 101 and the controller 102 also transmit and receive data to and from each other.

The communication unit 45 transmits and receives signals to and from the semiconductor processing apparatus 100 via wireless communication. In this embodiment, the communication unit 45 of the overhead transport vehicle 40 and the communication unit 101 of the semiconductor processing apparatus 100 communicate wirelessly with each other. Wireless communication between the overhead transport vehicle 40 and the semiconductor processing apparatus 100 is, for example, transmission and reception of a wireless signal performed during transfer of the FOUP 200. The transfer of the FOUP 200 includes both of transfer of the FOUP 200 from the overhead transport vehicle 40 to the semiconductor processing apparatus 100 and transfer of the FOUP 200 from the semiconductor processing apparatus 100 to the overhead transport vehicle 40. During the wireless communication between the overhead transport vehicle 40 and the semiconductor processing apparatus 100, the wireless signal transmitted and received by the communication units 45, 101 is, for example, an interlock signal to limit the operation of the semiconductor processing apparatus 100 (in particular, the operation of the device port 110). The interlock signal is, for example, a signal (E84 signal) to be exchanged according to the procedure specified in E84 of the international standards for semiconductor manufacturing equipment (SEMI standards: Semiconductor Equipment and Materials International standards). The E84 signal is normally transmitted and received between the overhead transport vehicle 40 and the semiconductor processing apparatus 100, whereby interference (contact, collision, etc.) of the gripping unit 41, the lifting mechanism 42, and the like of the overhead transport vehicle 40 with the semiconductor processing apparatus 100 at unintended locations can be prevented. Wireless communication between the overhead transport vehicle 40 and the semiconductor processing apparatus 100 is, for example, but not limited to, ANT communication using frequencies in the 2.4 GHz and 5.8 GHz bands.

According to the procedure specified in E84 above, a signal transmitted by the semiconductor processing apparatus 100 to the overhead transport vehicle 40 changes, and the overhead transport vehicle 40 receives the changed signal via the communication unit 45. Hereinafter, the signal transmitted by the semiconductor processing apparatus 100 to the overhead transport vehicle 40 is referred to as an output signal, and the signal input from the semiconductor processing apparatus 100 to the overhead transport vehicle 40 is referred to as an input signal. In addition to the E84 signal, the communication units 101 and 45 are constantly transmitting and receiving each other's received signal strength. The received signal strength is an indicator that allows communication environment conditions to be confirmed.

If the input signal input to the overhead transport vehicle 40 has not changed for a predetermined period of time (time-out determination period), the controller 44 determines that a time-out error has occurred. A time-out error is caused, for example, by a communication error or a device error. The communication error is caused, for example, by a communication failure (abnormality in the communication environment) due to interference such as signals generated by other devices. The received signal strength in a communication error is considered to be zero. The device error is caused, for example, by a failure of the semiconductor processing apparatus 100. When a time-out error has occurred, operation between the overhead transport vehicle 40 and the semiconductor processing apparatus 100 (e.g., transfer operation of the FOUP 200) stops. Hereinafter, the state in which no communication error occurs during E84 communication between the overhead transport vehicle 40 and the semiconductor processing apparatus 100 may be denoted as the "normal communication state".

As illustrated in FIG. 3, the overhead transport vehicle 40 includes a counter 46 and an output unit 47 in addition to the controller 44 and the communication unit 45. The counter 46 and the output unit 47 may be a part of the controller 44.

The counter 46 starts counting (generating a counter value) from the timing when a communication error has occurred during wireless communication between the overhead transport vehicle 40 and the semiconductor processing apparatus 100. In this embodiment, a value counted according to an elapsed time corresponds to the counter value. The counter value only needs to be a value that changes with the elapsed time according to a predetermined rule. In this embodiment, the counter value is the elapsed time itself. The counter 46 resets the counter value when the communication error has been resolved after the counter value is generated (i.e., when the received signal strength indicates a value other than zero). This allows the counter value to indicate a period of the latest communication error state. In addition, the operator can easily identify the time of occurrence of the communication error state from the output counter value. The counter 46 resets the counter value whenever reception is possible (e.g., in the normal communication state and when the overhead transport vehicle 40 can receive wireless signals from the semiconductor processing apparatus 100).

The output unit 47 outputs the counter value generated by the counter 46 to the controller 44 or other devices when a time-out error has occurred. In this embodiment, the time-out error is defined as a state in which the overhead transport vehicle 40 cannot recognize a change in the output signal of the semiconductor processing apparatus 100 during the predetermined period of time. The state in which the overhead transport vehicle 40 cannot recognize a change in the output signal of the semiconductor processing apparatus 100 corresponds to the state in which the input signal has not changed. The output unit 47 outputs the counter value only when a time-out error has occurred. Thus, for example, when an E84 signal is not exchanged between the overhead transport vehicle 40 and the semiconductor processing apparatus 100, the output unit 47 will not output the counter value even if the counter value is generated.

Referring to FIGS. 4(*a*) and 4(*b*) and FIGS. 5(*a*) and 5(*b*), the following describes examples (normal examples) when wireless communication between the overhead transport vehicle 40 and the semiconductor processing apparatus 100 can be normally performed. Each of FIGS. 4(*a*) and 4(*b*) and FIGS. 5(*a*) and 5(*b*) is a timing chart for describing the normal examples of wireless communication between the overhead transport vehicle 40 and the semiconductor processing apparatus 100. In each of FIGS. 4(*a*) and 4(*b*) and FIGS. 5(*a*) and 5(*b*), timing T0 indicates the start timing of the time-out determination period, timing T1 indicates the end timing of the time-out determination period, timings Ts, $Ts_1$, and $Ts_2$ each indicate the occurrence timing of a communication error, timing Te indicates the end timing of the communication error, the dashed arrows indicate the normal communication state, and the area surrounded by the dashed line indicates the communication error state. In each of FIGS. 4(*a*) and 4(*b*) and FIGS. 5(*a*) and 5(*b*), the initial value of the output signal is a value PL and the initial value of the input signal is a value CL. The value PL of the output signal changes to a value PH at timing Tp between the timing T0 and the timing T1. This change from the value PL to the value PH is made, for example, by the controller 102 of the semiconductor processing apparatus 100. The change of the input signal from the value CL to a value CH is implemented by receiving an output signal indicating the value PH. Thus, the input signal is not updated unless the overhead transport vehicle 40 receives an output signal indicating the value PH.

In a first normal example illustrated in FIG. 4(*a*), wireless communication between the overhead transport vehicle 40 and the semiconductor processing apparatus 100 is normally performed throughout the entire time-out determination period. In this case, at the timing Tp, the input signal changes normally from the value CL to the value CH when the output signal changes from the value PL to the value PH. In this case, the controller 44 determines that no time-out error has occurred.

In a second normal example illustrated in FIG. 4(*b*), the normal communication state continues at least from the timing T0 to the timing Tp. In addition, a communication error state occurs after the timing Tp and before the timing T1. In this case, as in the first normal example, the input signal changes from the value CL to the value CH when the output signal changes from the value PL to the value PH, and thus the input signal changes normally. As in the first normal example, the controller 44 determines that no time-out error has occurred. From the timing Ts later than the timing Tp, the counter 46 generates a counter value. However, in the second normal example, the output unit 47 does not output the counter value because it is determined that no time-out error has occurred. Even after the timing T1 has passed, the counter 46 may continue to count as long as the communication error continues.

In a third normal example illustrated in FIG. 5(*a*), a communication error state occurs from between the timing T0 and the timing Tp. The communication error state continues until the timing Te between the timing Tp and the timing T0. In addition, the normal communication state continues from the timing Te to the timing T1. In this case, the input signal does not change from the timing Tp to the timing Te. However, the input signal changes normally when the output signal indicating the value PH has been received by the overhead transport vehicle 40 in the normal communication state at the timing Te and later. As in the first and second normal examples, the controller 44 determines that no time-out error has occurred. Although the counter value is generated by the counter 46 between the timing Tp and the timing Te, the counter value is reset at the timing Te. The counter value may be reset between the timing Te and the timing T1. The same applies in the following examples.

In a fourth normal example illustrated in FIG. 5(*b*), as in the third normal example, a communication error state occurs from the timing $Ts_1$, which is between the timing T0 and the timing Tp. The communication error state continues until the timing Te, which is between the timing Tp and the timing T0. In addition, another communication error state occurs from the timing $Ts_2$ which is later than the timing Te, to the timing T1. In this case, as in the third normal example, the input signal is not updated at the timing Tp. However, in the normal communication state that is between the timing Te and the timing $Ts_2$, an output signal indicating the value PH is received by the overhead transport vehicle 40. This allows the input signal to change normally. As in the first to third normal examples, the controller 44 determines that no time-out error has occurred. Although the counter value is generated by the counter 46 between the timing $Ts_1$ and the timing Te, the counter value is reset at the timing Te. However, from the timing $Ts_2$, a new counter value is generated by the counter 46. Herein, in the fourth normal example, the new counter value is not output because it is determined that no time-out error has occurred. The generation of the new counter value by the counter 46 can continue until the communication error that has occurred at the timing $Ts_2$ is resolved.

Referring to FIGS. 6(*a*) and 6(*b*) and FIGS. 7(*a*) and 7(*b*), the following describes examples (abnormal examples) when wireless communication between the overhead transport vehicle 40 and the semiconductor processing apparatus 100 cannot be normally performed. Each of FIGS. 6(*a*) and 6(*b*) and FIGS. 7(*a*) and 7(*b*) is a timing chart for describing the abnormal examples of wireless communication between the overhead transport vehicle 40 and the semiconductor processing apparatus 100.

In a first abnormal example illustrated in FIG. 6(*a*), wireless communication between the overhead transport vehicle 40 and the semiconductor processing apparatus 100 is normally performed throughout the entire time-out determination period. Thus, the counter 46 does not change the counter value from zero. Meanwhile, from the timing T0 to the timing T1, the output signal value remains at PL. Thus, the input signal does not indicate the value CH until the timing T1, and the controller 44 determines that a time-out error has occurred. In this case, the output unit 47 outputs a counter value of zero. The controller 44, for example, outputs the counter value as log information.

In a second abnormal example illustrated in FIG. 6(*b*), the communication error state continues throughout the entire time-out determination period. The counter 46 generates a counter value from the time when reception has become impossible until the reception is resumed. Meanwhile, although the value of the output signal changes to the value PH at the timing Tp, the value of the input signal remains at the value CL from the timing T0 to the timing T1. Thus, as in the first abnormal example, the controller 44 determines that a time-out error has occurred. In this case, the output unit 47 outputs the counter value that is a counter value at the timing T1. The minimum counter value assumed in the second abnormal example corresponds to the elapsed time from the timing T0 to the timing T1. If the communication error has occurred before the timing T0, the counter value is greater than the elapsed time from the timing T0 to the timing T1. Also in the case in which both a device error and a communication error have occurred, the generation of the counter value starts from the time when the communication error has occurred.

In a third abnormal example illustrated in FIG. 7(*a*), a communication error state continues from before the timing Tp to the timing T1. In this case, the counter 46 generates a counter value from the timing Ts between the timing T0 and the timing Tp. Meanwhile, the value of the input signal remains at the value CL from the timing T0 to the timing T1 as in the first and second abnormal examples. Thus, as in the first and second abnormal examples, the controller 44 determines that a time-out error has occurred. In this case, the output unit 47 outputs the counter value that is a counter value at the timing T1. The counter value output in the third abnormal example corresponds to the elapsed time from the timing Ts to the timing T1. Also in the case in which a device error has occurred at the timing Ts and later, the output counter value corresponds to the elapsed time from the time when the communication error has occurred (the timing Ts) to the timing T1.

In a fourth abnormal example illustrated in FIG. 7(*b*), a plurality of communication error states occur intermittently between the timing T0 and the timing T1. In the fourth abnormal example, a first communication error state continues from timing Ts to the timing Te, and a second communication error state continues from the timing $Ts_2$, which is later than the timing Te, to the timing T1. In this case, the counter value generated by the counter 46 in the first communication error state is reset at the timing Te. The counter 46 also generates a new counter value from the timing $Ts_2$. Meanwhile, the value of the input signal remains at the value CL from the timing T0 to the timing T1 as in the first to third abnormal examples. Thus, as in the first to third abnormal examples, the controller 44 determines that a time-out error has occurred. In this case, the output unit 47 outputs the above-described new counter value that is a counter value at the timing T1. The counter value output in the fourth abnormal example corresponds to the elapsed time from the timing $Ts_2$ to the timing T1, for example.

The counter value output when a time-out error has occurred in each abnormal example can be used as an indicator to estimate the cause of the time-out error. For example, if the counter value output by the output unit 47 is zero (i.e., in the case of the first abnormal example), the operator can easily understand that there was no problem in the communication environment between the overhead transport vehicle 40 and the semiconductor processing apparatus 100. This allows the operator to presume that the time-out error was caused by a device error.

If the counter value output by the output unit 47 is non-zero (i.e., in the case of the second to fourth abnormal examples), the operator can estimate the cause of the time-out error by checking the output counter value. For example, the operator can easily estimate whether the normal communication state was present between the timing T0 and the timing T1 by checking the output counter value. Based on such estimation, the operator can estimate whether the cause or main cause of the time-out error in each of the second to fourth abnormal examples is a communication error or a device error.

Specifically, at the time when a time-out error has occurred, the operator can obtain the length of the time-out determination period (from the timing T0 to the timing T1), the output counter value, and the signal state (the value CL, the value CH) of the overhead transport vehicle 40 when the time-out error has occurred. Although the timing Tp is illustrated for convenience in FIGS. 6(*a*) and 6(*b*) and 7(*a*) and 7(*b*), the timing Tp cannot be obtained by the operator. When the output counter value is zero (first abnormality example), the operator can presume that no communication error occurred and that a device error occurred. When the output counter value is greater than the time-out determination period (second error example), the operator can presume that a communication error constantly occurred during the time-out determination period, or that a communication error had occurred before the time-out determination started. In this case, there is a possibility that a device error may also have occurred during the occurrence of the communication error. When the output counter value is smaller than the time-out determination period (third and fourth abnormal examples), the magnitude of the output counter value indicates the length of the period during which the communication error occurred, and the degree of the possibility of the device error can be estimated.

In the conveyance system 1 described above, the operator can estimate whether the cause of the time-out error is a communication error or a device error of the semiconductor processing apparatus 100 simply by checking the counter value output from the output unit 47. Thus, with the conveyance system 1, it is possible to assist in determining the cause of a time-out error.

The wireless communication between the overhead transport vehicle 40 and the semiconductor processing apparatus 100 may be wireless communication of an E84 signal specified in the international standard for semiconductor manufacturing equipment, and the output unit 47 may output the counter value only when a time-out error due to the E84 signal has occurred. In this case, generation and output of counter values during an unnecessary period of time can be prevented. Consequently, counter values useful for determining the cause of time-out errors can be reliably output.

The conveyance system according to this disclosure is as described in [1] to [6] below, and these have been described in detail based on the above embodiment.

[1] A conveyance system including a transport vehicle, the transport vehicle being configured to transport an article to or from a passive device and including a communication unit configured to communicate wirelessly with the passive device, wherein
 the transport vehicle includes:
  a counter configured to generate a counter value corresponding to an elapsed time from a timing when reception has become impossible due to a communication failure during wireless communication with the passive device; and
  an output unit configured to output the counter value when a time-out error has occurred in the transport vehicle, and
 the counter resets the counter value whenever reception is possible.

[2] The conveyance system according to [1], wherein
 the wireless communication between the transport vehicle and the passive device is wireless communication of an E84 signal specified in an international standard for semiconductor manufacturing equipment, and
 the output unit outputs the counter value only when a time-out error due to the E84 signal has occurred.

[3] The conveyance system according to [1] or [2], wherein the counter value is the elapsed time itself.

[4] The conveyance system according to any one of [1] to [3], wherein the timing corresponds to a timing when a communication error between the transport vehicle and the passive device has occurred.

[5] The conveyance system according to any one of [1] to [4], wherein the time-out error occurs when the transport vehicle has failed to recognize a change in an output signal of the passive device during a predetermined period of time.

[6] The conveyance system according to any one of [1] to [5], wherein the counter constantly resets the counter value during the wireless communication between the transport vehicle and the passive device.

However, this disclosure is not limited to the above embodiment and [1] to [6] above. The disclosure may be further modified. For example, in the above embodiment, the conveyance system is installed in a semiconductor processing plant. However, this disclosure is not limited to this, and the conveyance system may be installed in other facilities. In this case, a processing device configured to perform some kind of processing on an article is installed as the passive device in other facilities. In other facilities, the interlock signal is not limited to the E84 signal. Thus, in the above embodiment, the semiconductor processing apparatus is used as the passive device. However, this disclosure is not limited to this.

In the above embodiment, the first track and the second track are disposed in parallel with each other in the up-down (vertical) direction. However, this disclosure is not limited to this. As the tracks for the overhead transport vehicle, only one track may be disposed, or a plurality of tracks of three or more tracks arranged side by side may be disposed. The arrangement may be such that only some of the tracks overlap in the up-down (vertical) direction, or tracks having different heights may not overlap in the up-down (vertical) direction.

In the above embodiment, when viewed from the vertical direction, the storage shelves are provided on the side opposed to the device ports with the first track and the second track interposed therebetween. However, this disclosure is not limited to this. The processing ports and the storage shelves may be disposed on the same side with respect to the tracks. The storage shelves may be provided inside the intrabay route having a loop shape, or may be provided outside.

In the above embodiment, the transport vehicle is an overhead transport vehicle configured to travel on a track installed on the ceiling of a semiconductor processing plant. However, this disclosure is not limited to this. The transport vehicle may be a transport vehicle configured to travel on a track installed on the floor, or may be a transport vehicle configured to travel directly on the floor.

The invention claimed is:

1. A conveyance system comprising a transport vehicle configured to transport an article to or from a passive device, wherein the transport vehicle includes:

a communication unit configured to transmit and receive a wireless signal to and from the passive device while constantly transmitting and receiving received signal strength to and from the passive device during transfer of the article;

a counter configured to generate a counter value corresponding to an elapsed time from a timing when the communication unit has missed receiving the received signal strength transmitted from the passive device during the transfer of the article; and an output unit configured to output the counter value when a time-out error has occurred, the time-out error being a state in which the communication unit has failed to recognize the wireless signal output by the passive device during a predetermined period of time, the counter resets the counter value every time the received signal strength has been received, the wireless signal includes an E84 signal specified in an international standard for semiconductor manufacturing equipment, and the output unit is configured to output the counter value only when the time-out error due to the E84 signal has occurred.

2. A conveyance system comprising a transport vehicle configured to transport an article to or from a passive device, wherein the transport vehicle includes:

a communication unit configured to transmit and receive a wireless signal to and from the passive device while constantly transmitting and receiving received signal strength to and from the passive device during transfer of the article;

a counter configured to generate a counter value corresponding to an elapsed time from a timing when the communication unit has missed receiving the received signal strength transmitted from the passive device during the transfer of the article; and an output unit configured to output the counter value when a time-out error has occurred, the time-out error being a state in which the communication unit has failed to recognize the wireless signal output by the passive device during a predetermined period of time, the counter resets the counter value every time the received signal strength has been received, and the counter value is the elapsed time itself.

3. A conveyance system comprising a transport vehicle configured to transport an article to or from a passive device, wherein the transport vehicle includes:

a communication unit configured to transmit and receive a wireless signal to and from the passive device while constantly transmitting and receiving received signal strength to and from the passive device during transfer of the article;

a counter configured to generate a counter value corresponding to an elapsed time from a timing when the communication unit has missed receiving the received signal strength transmitted from the passive device during the transfer of the article; and an output unit configured to output the counter value when a time-out error has occurred, the time-out error being a state in which the communication unit has failed to recognize the wireless signal output by the passive device during a predetermined period of time, the counter resets the counter value every time the received signal strength has been received, and the counter constantly resets the counter value during wireless communication between the transport vehicle and the passive device.

* * * * *